US008982800B2

(12) United States Patent
Takamatsu et al.

(10) Patent No.: US 8,982,800 B2
(45) Date of Patent: Mar. 17, 2015

(54) COMMUNICATION SYSTEM, BASE STATION, TERMINAL, AND COMMUNICATION METHOD

(75) Inventors: Nobuaki Takamatsu, Kanagawa (JP); Hironobu Tanigawa, Kanagawa (JP); Yasuhiro Nakamura, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1141 days.

(21) Appl. No.: 12/517,052

(22) PCT Filed: Nov. 29, 2007

(86) PCT No.: PCT/JP2007/073063
§ 371 (c)(1),
(2), (4) Date: Nov. 6, 2009

(87) PCT Pub. No.: WO2008/066120
PCT Pub. Date: Jun. 5, 2008

(65) Prior Publication Data
US 2010/0074197 A1    Mar. 25, 2010

(30) Foreign Application Priority Data

Nov. 29, 2006  (JP) ............................... P2006-322545
Dec. 25, 2006  (JP) ............................... P2006-347755

(51) Int. Cl.
*H04W 72/00* (2009.01)
*H04L 5/00* (2006.01)
(Continued)

(52) U.S. Cl.
CPC ............ *H04L 5/0096* (2013.01); *H04L 5/0007* (2013.01); *H04L 5/0042* (2013.01);
(Continued)

(58) Field of Classification Search
CPC ..... H04W 72/04; H04W 72/10; H04W 88/06; H04L 5/0007; H04L 5/0053; H04L 5/0096; H04L 5/0042; H04L 5/0064; H04L 5/0087
USPC ........................................................ 370/329
See application file for complete search history.

(56) References Cited

U.S. PATENT DOCUMENTS 6,201,974 B1 *  3/2001  Lietsalmi et al. ............. 455/466
6,363,058 B1    3/2002  Roobol et al.
(Continued)

FOREIGN PATENT DOCUMENTS

CN        1271498        10/2000
JP        2000-224231     8/2000
(Continued)

OTHER PUBLICATIONS

Office Action from Japanese Patent Application No. 2006-322545, mailed on Mar. 29, 2011.
(Continued)

*Primary Examiner* — Sulaiman Nooristany
(74) *Attorney, Agent, or Firm* — Duane Morris LLP

(57) ABSTRACT

A multiservice is implemented by connecting one base station and one terminal via one wireless link.
There is provided communication control means 2-1 that performs communication in compliance with an OFDMA scheme having traffic channels including first sub-channels for containing information showing enabled or disabled sub-channels and second sub-channels for storing data pertaining to services in correspondence with the first sub-channels, that allocates a plurality of first sub-channels to a plurality of services, respectively, and that connects one base station to one terminal via one wireless link, thereby establishing communication pertaining to the plurality of services.

9 Claims, 4 Drawing Sheets

(51) Int. Cl.
*H04L 27/26* (2006.01)
*H04W 28/18* (2009.01)

(52) U.S. Cl.
CPC ............ *H04L5/0053* (2013.01); *H04L 5/0064* (2013.01); *H04L 5/0087* (2013.01); *H04L 27/2604* (2013.01); *H04W 28/18* (2013.01)
USPC .......................................................... 370/329

(56) References Cited

U.S. PATENT DOCUMENTS

| | | | |
|---|---|---|---|
| 6,597,682 | B1 * | 7/2003 | Kari ............................. 370/348 |
| 7,551,937 | B2 | 6/2009 | Kim et al. |
| 2002/0169008 | A1 * | 11/2002 | Hiben et al. ................. 455/574 |
| 2006/0009224 | A1 * | 1/2006 | Lim et al. ..................... 455/442 |

FOREIGN PATENT DOCUMENTS

| | | |
|---|---|---|
| JP | 2002-525934 | 8/2002 |
| JP | 2005-006019 | 1/2005 |
| JP | 2005-530377 | 10/2005 |
| JP | 2006-050615 | 2/2006 |
| JP | 2006-217636 | 8/2006 |
| JP | 2006-528453 | 12/2006 |
| JP | 2008-141247 | 6/2008 |
| JP | 2008-141710 | 6/2008 |
| JP | 2008-211759 | 9/2008 |
| JP | 2011-015421 | 1/2011 |
| WO | WO-03/094561 | 11/2003 |
| WO | WO-2005/008360 | 1/2005 |

OTHER PUBLICATIONS

Office Action from Japanese Patent Application No. 2006-347755, mailed on Mar. 29, 2011.

Office Action from Japanese Patent Application No. 2006-322545, mailed on Jun. 15, 2010, 2 pages.

Ali-Yahiya et al., "Radio Resource Allocation in Mobile WiMax Networks Using Service Flows," 18th Annual IEEE International Symposium on Personal, Indoor and Mobile Radio Communications (PIMRC '07), 4 pages.

International Search Report for PCT/JP2007/073063, mailed on Jan. 22, 2008, 4 pages.

Office Action from Chinese Patent Application No. 200780044071.X, mailed on Apr. 25, 2011, 9 pages.

\* cited by examiner

COMMUNICATION SYSTEM, BASE STATION, TERMINAL, AND COMMUNICATION METHOD

CROSS-REFERENCE TO RELATED APPLICATIONS

This application is a U.S. National Phase Application of International Application No. PCT/JP2007/073063 filed Nov. 29, 2007, which claims priority to Japanese Application No. 2006-322545 filed Nov. 29, 2006 and Japanese Application No. 2006-347755 filed Dec. 25, 2006, the disclosures of which are incorporated herein in their entirety.

TECHNICAL FIELD

The present invention relates to a communication system, and a base station, a terminal and a communication method used in the communication system.

BACKGROUND ART

QoS control for a wireless section in a mobile communication system, such as a digital portable telephone system and a PHS system, is implemented by a data link layer (a MAC layer) in the OSI reference model. Here, QoS (Quality of Service) is a function of setting a priority (service priority) for each communication in the network, thereby guaranteeing transmission quality.

In a case where an attempt is made to implement QoS control in a wireless section in such a mobile communication system, for instance, when down-link (a down line) data reached the MAC layer in IPv4, an IP header has already been removed, and therefore control utilizing a TOS field of the IP header cannot be performed.

Therefore, negotiations for service priority are conducted in the course of connection of a call from a terminal, and QoS control is performed for each wireless link.

Incidentally, when a multiservice (also called a multi-call), which corresponds to a plurality of services, is introduced for one user in a next-generation mobile communication system, a mixture of services of different service priorities is conceivable. For instance, a conceivable case is a mixture of VoIP (Voice Over IP) (for instance, a service with the highest service priority) for transmitting and receiving audio data by converting it into an IP packet and an electronic mail (e-mail) (for example, a service with the lowest service priority), and the like.

Patent Document 1 shows a method for managing a plurality of independent simultaneous calls between a mobile communication network and a subscriber terminal.

Patent Document 1: JP-T-2002-525934 (the term "JP-T" as used herein means a published translation of a PCT patent application)

DISCLOSURE OF THE INVENTION

Problem that the Invention is to solve

The related-art technique, such as that described in connection with Patent Document 1, permits only one wireless link for one user. Hence, it is impossible to mix different service priorities. Alternatively, even if they can be mixed, there will arise a problem of an inability to impart a plurality of service priorities to a single wireless link.

The present invention has been conceived to solve the problem and aims at obtaining a communication system, a base station, a terminal and a communication method which enable implementation of a multiservice by connecting one base station to one terminal via one wireless link.

Means for Solving the Problem

In order to solve the problem, a communication system of the present invention comprises communication control means that allocates one wireless link between one base station and one terminal and that adds, in the one wireless link, communication including, in addition to a service provided by communication initially performed, a service differing from the service (claim 1).

As a result, one base station and one terminal are connected via one wireless link, and a plurality of services can be realized.

The communication system is characterized by performing communication in compliance with an OFDMA scheme having traffic channels including first sub-channels for containing information showing enabled or disabled sub-channels and second sub-channels for storing data pertaining to the services in correspondence with the first sub-channels, wherein, when the communication control means adds the communication including, in addition to the service provided by the initially-performed communication, the service differing from the service, the communication control means allocates, in addition to the first sub-channel allocated to the initially-performed communication, the first sub-channel differing from the first sub-channel (claim 2).

By this configuration, the first sub-channels are allocated to the plurality of services, respectively, whereby one base station and one terminal can be connected via one wireless link.

The communication control means of the communication system is characterized by associating, on the basis of priorities corresponding to the respective services, the priorities with the first sub-channels (claim 3). By this configuration, negotiations on a QoS service between the base station and the terminal can be conducted by the first sub-channel, and an added service can be established.

The communication control means of the communication system is characterized by allocating the second sub-channel on the basis of the priority (claim 4).

By this configuration, second sub-channels appropriate for a QoS service class can be allocated in correspondence to the first sub-channel. When the QoS service class is high, a larger number of second sub-channels are allocated, whereby a band is broadened and high-speed communication becomes feasible. In the meantime, when the QoS service class is low, a smaller number of second sub-channels are allocated, so that a traffic data volume can be diminished.

A base station of the present invention is characterized by performing communication in compliance with an OFDMA scheme having traffic channels including first sub-channels for containing information showing enabled or disabled sub-channels and second sub-channels for storing data pertaining to communication services in correspondence with the first sub-channels, and in that, when the communication control means adds communication including, in addition to a service provided by initially-performed communication, a service differing from the service, the communication control means allocates, in addition to the first sub-channel allocated to the initially-performed communication, the first sub-channel differing from the first sub-channel (claim 5).

By this configuration, the first sub-channels are allocated to a service that is provided by initially-performed communication and an additional different service, respectively. Thus, plurality of services can be provided by connecting one base station to one terminal via one wireless link.

The communication control means of the base station is characterized by associating, on the basis of priorities corresponding to the respective services, the priorities with the first sub-channels, and allocating second sub-channels in numbers appropriate for the priority (claim 6).

By this configuration, second sub-channels in numbers appropriate for the QoS service class can be allocated in correspondence to the first sub-channel. When the QoS service class is high, a larger number of second sub-channels are allocated, whereby a band is broadened and high-speed communication becomes feasible. In the meantime, when the QoS service class is low, a smaller number of second sub-channels are allocated, so that a traffic data volume can be diminished.

A terminal of the present invention is characterized by performing communication in compliance with an OFDMA scheme having traffic channels including first sub-channels for containing information showing enabled or disabled sub-channels and second sub-channels for storing data pertaining to communication services in correspondence with the first sub-channels, and in that, the communication control means adds communication including, in addition to a service provided by initially-performed communication, a service differing from the service, the communication control means allocates, in addition to the first sub-channel allocated to the initially-performed communication, the first sub-channel differing from the first sub-channel (claim 7).

By this configuration, the first sub-channels are allocated to a service that is provided by initially-performed communication and an additional different service, respectively. Thus, plurality of services can be provided by connecting one base station to one terminal via one wireless link.

The terminal is characterized in that a communication band is requested in response to each of the plurality of services (claim 8).

By this configuration, second sub-channels in numbers appropriates for a QoS service class can be allocated in correspondence to the first sub-channel. When the QoS service class is high, a larger number of second sub-channels are allocated, whereby a band is broadened and high-speed communication becomes feasible. In the meantime, when the QoS service class is low, a smaller number of second sub-channels are allocated, so that a traffic data volume can be diminished.

A communication method of the present invention is characterized by performing communication in compliance with an OFDMA scheme having traffic channels including first sub-channels for containing information showing enabled or disabled sub-channels and second sub-channels for storing data pertaining to communication services in correspondence with the first sub-channels, and by comprising: a step in which the base station adds and allocates the first sub-channel for each additional service for which a terminal has requested establishment and notifies the terminal of the first sub-channel; a step of transmitting a service addition acknowledgment from the base station to the terminal; a step in which the terminal that received the service addition acknowledgment requests a communication band for the additional service to the base station; and a step in which the base station that received the request for the communication band allocates to the terminal the second sub-channels in numbers appropriate for the communication band of the additional service (claim 9).

By this configuration, the first sub-channels are allocated to a service that is provided by initially-performed communication and an additional different service, respectively. Thus, plurality of services can be provided by connecting one base station to one terminal via one wireless link. The first sub-channel is allocated to each of the plurality of services, whereby one base station and one terminal can be connected via one wireless link. Moreover, second sub-channels in numbers appropriates for a QoS service class can be allocated in correspondence to the first sub-channel. When the QoS service class is high, a larger number of second sub-channels are allocated, whereby a band is broadened and high-speed communication becomes feasible. In the meantime, when the QoS service class is low, a smaller number of second sub-channels are allocated, so that a traffic data volume can be diminished.

Advantages of the Invention

According to the present invention, a multiservice can be implemented by connecting one base station with one terminal via one wireless link.

DESCRIPTIONS OF REFERENCE NUMERALS

1 COMMUNICATION SYSTEM
2 BASE STATION
2-1 COMMUNICATION CONTROL MEANS
2-2 TRANSMISSION MEANS
2-3 RECEIVING MEANS
3 TERMINAL
3-1 TRANSMISSION MEANS
3-2 RECEIVING MEANS
4 NETWORK
S1 TO S4 TIME SLOT
C1 TO C4 CONTROL SUB-CHANNEL
T1 TO T108 TRAFFIC SUB-CHANNEL

BEST MODE FOR IMPLEMENTING THE INVENTION

First, prior to descriptions of a communication system of an embodiment, a frame configuration of an OFDMA used in the communication system will be described by reference to a descriptive view of FIG. 1.

Figure 1:
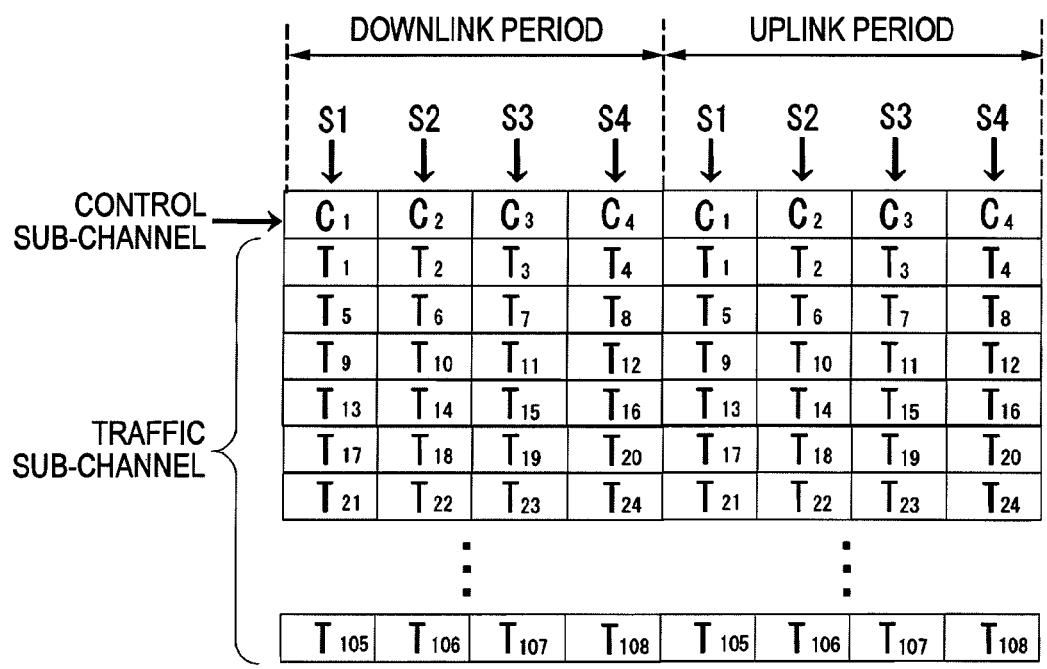
[FIG. 1] A descriptive view showing a frame configuration of an OFDMA used in a communication method of an embodiment of the present invention.

FIG. 1 shows a frame configuration of an OFDMA for a case where time slots used for the communication system are; for instance, four (S1 to S4), wherein the vertical axis is a frequency axis and the horizontal axis is a time axis.

In FIG. 1, each of a downlink period and an uplink period is divided into 28 frequency bands with respect to a frequency axis. A sub-channel in the first frequency band is called a control sub-channel and used for a control channel (CCH). The first frequency band may be either the highest frequency band or the lowest frequency band. Further, the control sub-channel commands which of sub-channels of the time slots is used for each of the frequency bands.

In an example shown in FIG. 1, base stations that can be specified by the control sub-channels C1 to C4 are four base stations. The remaining 27 frequency bands include traffic sub-channels T1 through T108 for transmitting and receiving data. The remaining frequency bands include a total of 108 sub-channels; namely, 27 sub-channels along the frequency axis, and four sub-channels along the time axis.

The traffic sub-channels include two types of sub-channels, wherein the first sub-channels are named anchor sub-channels, and the second sub-channels are named extra sub-channels.

The anchor sub-channel is a sub-channel used for notifying a terminal receiving the anchor sub-channel of which sub-channel is to be used or for conducting negotiations, between a base station and a terminal, about whether or not data can have been properly exchanged through retransmission control. At least one anchor sub-channel is allocated to one wireless link.

The extra sub-channel is a sub-channel for storing data pertaining to a service. Extra sub-channels in numbers appropriate to a QoS service class are allocated with respect to one anchor sub-channel. In this case, the larger the number of allocated extra sub-channels, the wider the band, and hence high-speed communication becomes possible.

Therefore, when the QoS service class is high (a service with a high service priority), a larger number of extra sub-channels are allocated. In the meantime, when the QoS service class is low (a service with a low service priority), a small number of extra sub-channels is allocated, so that a data rate appropriate to the service priority can be implemented.

Figure 2:
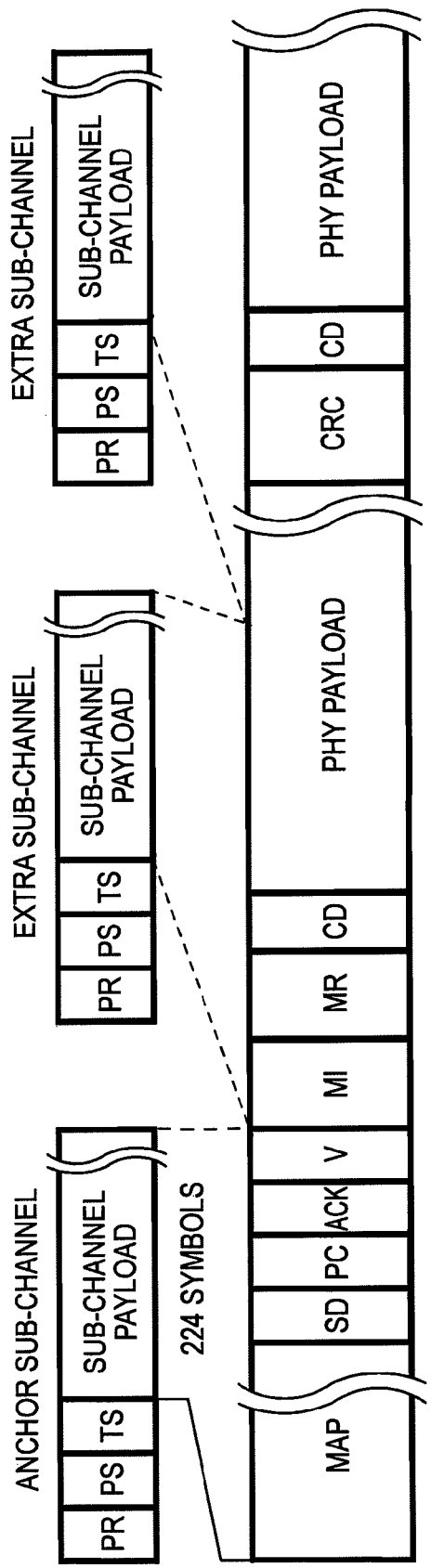
[FIG. 2] A view for describing a format of a sub-channel in a communication system of the embodiment of the present invention.

Next, a format of the sub-channel will be described by reference to FIG. 2.

Each of the sub-channels includes a PR (PRiamble) field, a PS (Pilot Symbol) field, and other fields. PR represents a preamble and is a signal for providing a timing for causing a receiving terminal to recognize commencement of frame transmission and synchronize frame transmission. PS is a pilot symbol which is a known signal waveform or known data for acquiring a phase reference in order to correctly identify an absolute phase of a carrier wave. A sub-channel payload is an area of a physical layer (PHY) for containing information.

A format of the physical layer (PHY) for a downlink will now be described.

A sub-channel payload of the anchor sub-channel includes fields, such as an MAP field, an ACK field, and a sub-channel payload. A sub-channel payload of the extra sub-channel is linked to the sub-channel payload. The sub-channel payload of the extra sub-channel includes a field, such as a CD field, and a PHY payload.

The CD field is a one-bit area that identifies whether contents of the PHY payload are control information or data. When the bit is "0," it is shown that the contents are control information. When the bit is "1," it is shown that the contents are data.

The MAP field is MAP information to be transmitted to a terminal (information showing an enabled or disabled sub-channel to the terminal) and is represented as a 108-bit area corresponding to 108 traffic sub-channels T1 through T108 shown in FIG. 1.

For instance, when the twentieth bit of the MAP field is "1," it is notified that a traffic sub-channel T20 is enabled. Moreover, for instance, when a bit corresponding to the twenty-first traffic sub-channel is "0," it is notified that the traffic sub-channel T21 is disabled.

An embodiment of the communication system of the present invention will be described in detail hereunder by reference to the drawings.

Figure 3:
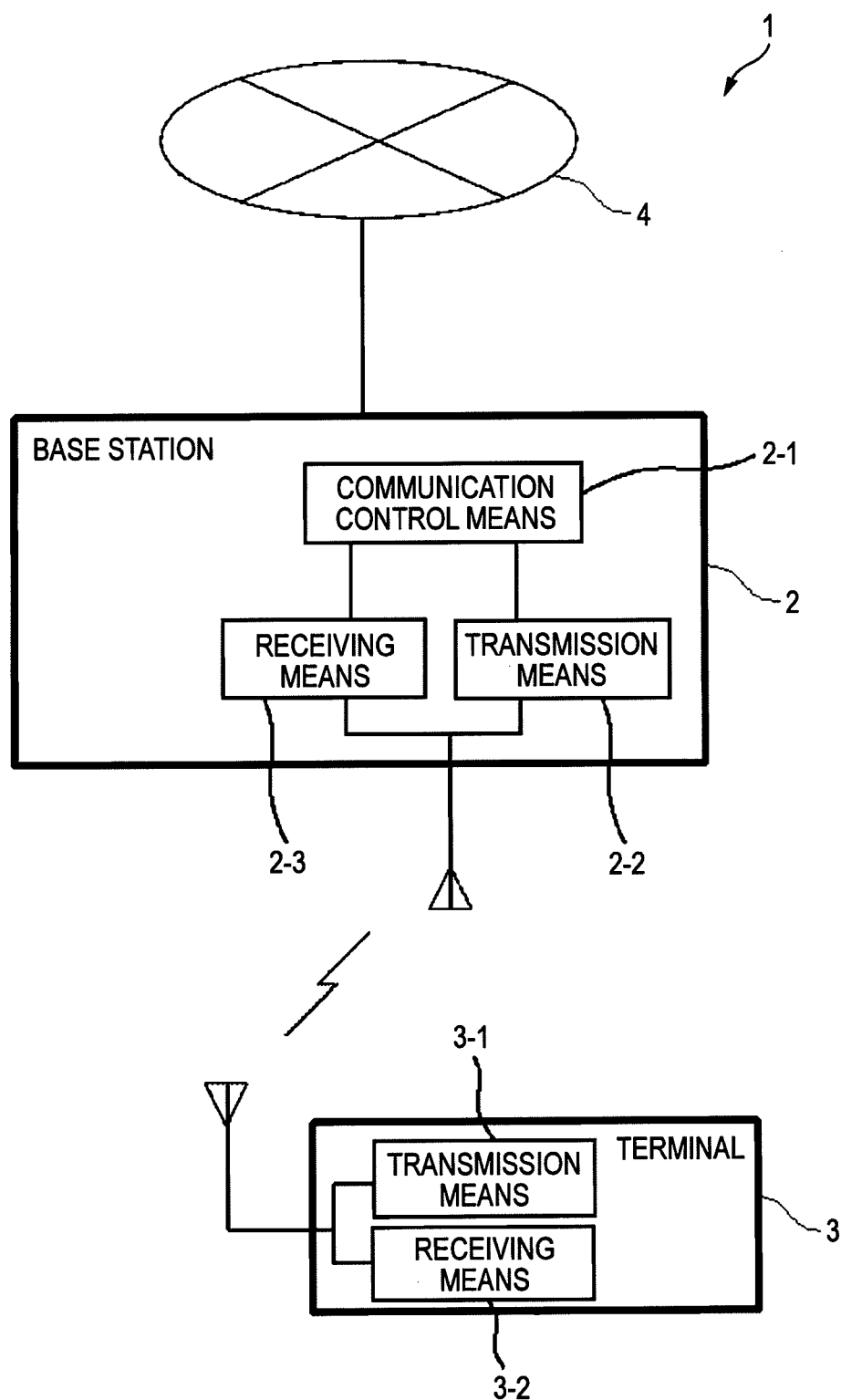
[FIG. 3] A block diagram of the communication system of the embodiment of the present invention.

FIG. 3 is a block diagram of the communication system of the embodiment of the present invention.

The communication system of the embodiment of the present invention is a communication system 1 that assigns one anchor sub-channel to one service according to the OFDMA scheme; that connects a base station 2 to a terminal 3 via one wirelesses link, thereby performing communication pertaining to a plurality of services. The base station 2 is connected to a network 4.

The base station 2 has communication control means 2-1 that controls communication of a base station, assigns one anchor sub-channel to one service and establishes a connection to the terminal 3 via one wireless link, thereby performing communication pertaining to a plurality of services; transmission means 2-2 that is connected to an antenna and that transmits data and audio to the terminal; and receiving means 2-3 that receives data and audio from the terminal.

The terminal 3 has transmission means 3-1 that is connected to the antenna and that transmits data and audio to the base station and receiving means 3-2 that receives data and audio from a base station.

Figure 4:
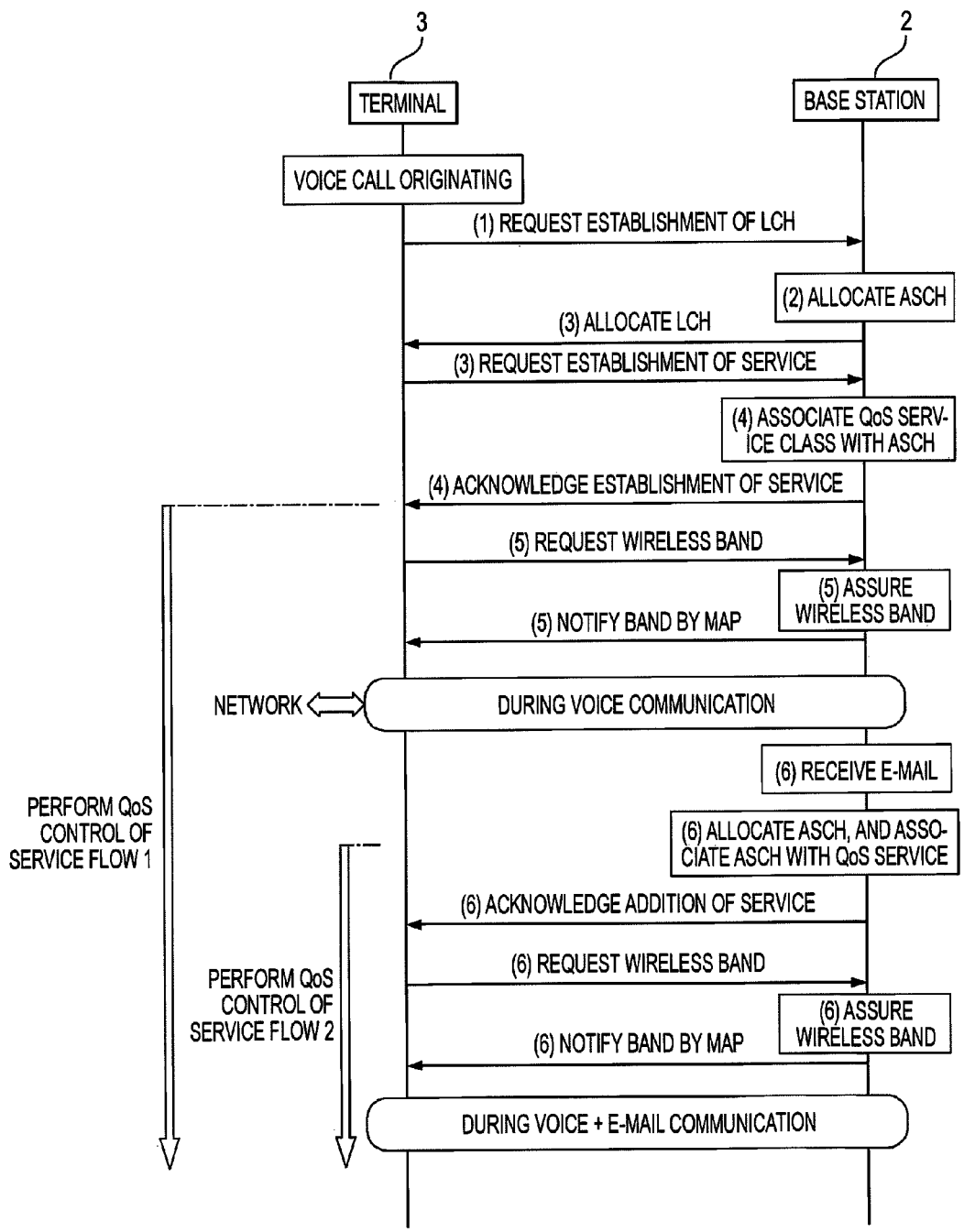
[FIG. 4] A sequence diagram of the communication system of the embodiment of the present invention.

In relation to the communication system of the present embodiment, FIG. 4 shows an example sequence of procedures for communication between the terminal 2 and the base station 3, and detailed explanations are provided by reference to the drawing.

The sequence shown in FIG. 4 is an example case where the terminal 2 originates a voice call and receives an E-mail during the course of voice communication (conversation).

(1) When the user has performed voice call originating operation on the terminal 3, the transmission means 3-1 of the terminal 3 transmits a link channel (LCH) establishment request to the base station 2 to be connected.

(2) The communication control means 2-1 of the base station 2 that received the link channel (LCH) establishment request allocates an anchor sub-channel (ASCH) in accordance with a carrier sense.

(3) The transmission means 2-2 notifies the terminal of the location of the anchor sub-channel (ASCH) by allocation of the link channel (LCH). The terminal 3 that received the allocated link channel (LCH) by the receiving means 3-2 transmits a service establishment request to the base station by the transmission means 3-1.

(4) The service establishment request received by the base station 2 includes a QoS service class. The communication control means 2-1 associates the QoS service class with the anchor sub-channel (ASCH). Thereby, negotiations on the QoS service are performed between the base station 2 and the terminal 3. The transmission means 2-2 of the base station 2 transmits a service establishment acknowledgment to the terminal 3.

(5) The terminal 3 that received the service establishment acknowledgement transmits a wireless band request to the base station 2. The base station 2 receives the wireless band request, and the communication control means 2-1 assures the wireless band for the service. In order to notify the thus-assured wireless band, the transmission means 2-2 of the base station 2 notifies the terminal 3 of the position of the extra sub-channel used for communication by the MAP included in the anchor sub-channel (ASCH) and commences voice communication (conversation). At this time, extra sub-channels in numbers appropriate for the QoS service class are allocated to voice communication. Since voice communication has the highest QoS service class (a service with the highest service priority), many extra sub-channels are allocated.

(6) When addition of a new service to the user who is in the course of voice communication is required during communication, such as an arrival of an e-mail at the base station 2, the communication control means 2-1 of the base station 2 allocates an anchor sub-channel (ASCH) to the new service and associates the QoS service class with the anchor sub-channel (ASCH).

Subsequently, the transmission means 2-2 of the base station 2 transmits a service addition acknowledgment to the terminal 3. The service addition acknowledgment notifies the terminal 2 of the position of the anchor sub-channel.

The transmission means 3-1 of the terminal 3 transmits a wireless band request for the added service to the base station 2. The base station 2 receives the wireless band request, and the communication control means 2-1 assures a wireless band for the added service. In order to notify the assured wireless band, the transmission means 2-2 notifies the terminal of the location of the extra sub-channel used for communication by the MAP included in the anchor sub-channel, and commences e-mail communication.

At this time, the extra sub-channels in numbers appropriate for the QoS service class are allocated to e-mail communication, and the anchor sub-channel (ASCH) is associated with the QoS service class. Since e-mail is a service having the lowest QoS service class (a service with the lowest service priority), a small number of extra sub-channels are allocated.

As mentioned above, the communication system of the present embodiment implements a multi-service by allowing allocation of a plurality of anchor sub-channels to one terminal.

In case of the communication system of the present embodiment, an anchor sub-channel (ASCH) for each of the services has an independent MAP; hence, locations of the extra sub-channels (ESCH) can be specified.

As mentioned above, one base station can be connected to one terminal via one wireless link by allocating anchor sub-channels to a plurality of services, respectively. Further, it is possible to allocate extra sub-channels in numbers appropriate for a QoS service class. Hence, in the case of a high QoS service class as in voice communication, a larger number of extra sub-channels are allocated, to broaden a band and enable high-speed communication.

In the meantime, in the case of a low QoS service class; for instance, an e-mail, a small number of extra sub-channels are allocated, so that sub-channels can be effectively utilized.

The invention claimed is:

1. A communication system comprising:
communication control means that allocates one wireless link between one base station and one terminal and that adds, in the one wireless link, communication including, in addition to a first service provided by communication initially performed, a second service differing from the first service, wherein
the first service has a first priority and the second service has a second priority differing from the first priority, wherein
communication is performed in compliance with an OFDMA scheme having traffic channels including first sub-channels including information showing enabled or disabled sub-channels and second sub-channels storing data pertaining to the services in correspondence with the first sub-channels, wherein,
when the communication control means adds the communication including, in addition to the first service provided by the initially-performed communication, the second service differing from the first service, the communication control means allocates, in addition to a first sub-channel allocated to the initially-performed communication, another first sub-channel differing from the first sub-channel allocated to the initially-performed communication, wherein the communication control means associates, on the basis of priorities corresponding to the respective services, the priorities with the first sub-channels and allocates the second sub-channels on the basis of the priority.

2. A base station that performs communication with a single wireless terminal in compliance with an OFDMA scheme having traffic channels including first sub-channels including information showing enabled or disabled sub-channels and second sub-channels storing data pertaining to communication services in correspondence with the first sub-channels, wherein,
when the communication control means adds communication including, in addition to a first service provided by initially-performed communication, a second service differing from the first service, the communication control means allocates, in addition to a first sub-channel allocated to the initially-performed communication, another first sub-channel differing from the first sub-channel allocated to the initially-performed communication, and wherein
the first service has a first priority and the second service has a second priority differing from the first priority, wherein the communication control means associates, on the basis of priorities corresponding to the respective services, the priorities with the first sub-channels, and allocates second sub-channels in numbers appropriate for the priority.

3. A terminal that performs communication in compliance with an OFDMA scheme having traffic channels including first sub-channels including information showing enabled or disabled sub-channels and second sub-channels storing data pertaining to communication services in correspondence with the first sub-channels, wherein,
when the communication control means adds communication including, in addition to a first service provided by initially-performed communication, a second service differing from the first service, the communication control means allocates, in addition to a first sub-channel allocated to the initially-performed communication, another first sub-channel differing from the first sub-channel allocated to the initially-performed communication, and wherein
the first service has a first priority and the second service has a second priority differing from the first priority, wherein the communication control means associates, on the basis of priorities corresponding to the respective services, the priorities with the first sub-channels and allocates the second sub-channels on the basis of the priority.

4. The terminal according to claim 3, wherein a communication band is requested in response to each of the plurality of services.

5. A communication method for performing communication between a base station and a terminal over a single wireless link in compliance with an OFDMA scheme having traffic channels including first sub-channels including information showing enabled or disabled sub-channels and second sub-channels storing data pertaining to communication services in correspondence with the first sub-channels, the method comprising:
allocating and adding, by the base station, a first sub-channel for each additional service for which a terminal has requested establishment and notifies the terminal of each first sub-channel;

transmitting a service addition acknowledgment from the base station to the terminal;

requesting, by the terminal that received the service addition acknowledgment requests, a communication band for the additional service to the base station; and allocating, by the base station that received the request for the communication band, to the terminal the second sub-channels in numbers appropriate for the communication band of the additional service on the basis of a priority corresponding to the additional service.

6. An OFDMA communication system, comprising a base station;

a terminal; and a communication controller that is configured to:

allocate a wireless link between the base station and the terminal;

allocate, for a first service, a first anchor sub-channel and first plural numbers of first extra sub-channels identified by the first anchor sub-channel, wherein the first anchor sub-channel includes information showing enabled or disabled sub-channels;

allocate, for a second service, a second anchor sub-channel and second plural numbers of second extra sub-channels identified by the second anchor sub-channel, wherein the second anchor sub-channels store data pertaining to the services in correspondence with the first anchor sub-channels; and add communication for the second service via the wireless link using the second anchor sub-channel and the second extra sub-channels during communication for the first service via the wireless link using the first anchor sub-channel and the first extra sub-channels, wherein the first and second extra sub-channels are allocated based on priorities corresponding to the respective services associated with those sub-channels.

7. The OFDMA communication system according to claim 6, wherein the controller is configured to determine the first plural number based on priority of the first service and the second plural number based on priority of the second service.

8. The communication system according to claim 1, wherein the communication control means secures a wireless band for the second service.

9. The base station according to claim 2, wherein the communication control means secures a wireless band for the second service.

\* \* \* \* \*